(12) United States Patent
Ward et al.

(10) Patent No.: US 9,317,180 B2
(45) Date of Patent: Apr. 19, 2016

(54) SYSTEMS AND METHODS FOR CONSUMER-GENERATED MEDIA REPUTATION MANAGEMENT

(75) Inventors: Miles Ward, Des Moines, WA (US);
James Webber, Puyallup, WA (US);
Dean M. Graziano, Mill Creek, WA (US)

(73) Assignee: VOCUS, INC., Beltsville, MD (US)

( * ) Notice: Subject to any disclaimer, the term of this patent is extended or adjusted under 35 U.S.C. 154(b) by 66 days.

(21) Appl. No.: 13/491,933

(22) Filed: Jun. 8, 2012

(65) Prior Publication Data

US 2013/0145323 A1 Jun. 6, 2013

Related U.S. Application Data

(63) Continuation of application No. 12/251,370, filed on Oct. 14, 2008, now abandoned, and a continuation-in-part of application No. 12/192,919, filed on Aug. 15, 2008, now abandoned, application (Continued)

(51) Int. Cl.
*G06F 3/048* (2013.01)
*G06F 3/0482* (2013.01)
(Continued)

(52) U.S. Cl.
CPC ............ *G06F 3/0482* (2013.01); *G06Q 10/06* (2013.01); *G06Q 10/10* (2013.01); *G06Q 30/02* (2013.01); *H04N 21/84* (2013.01)

(58) Field of Classification Search
CPC .................................................. H04N 21/84
USPC ................... 715/764, 738; 707/802–805, 748
See application file for complete search history.

(56) References Cited

U.S. PATENT DOCUMENTS

| 5,774,123 A | 6/1998 | Matson |
| 6,208,988 B1 | 3/2001 | Schultz |

(Continued)

FOREIGN PATENT DOCUMENTS

| KR | 10-2007-0021640 | 8/2005 |
| UA | 20040254904 | 12/2004 |

(Continued)

OTHER PUBLICATIONS

Golgher et al. An Example-Based Environment from Wrapper Generation Proceedings of the Workshop on Conceptual Modeling Approaches forE-Business and The World Wide Web and its Conceptual Modeling: Conceptual Modeling for E-Business on the Web; Oct. 2000, pp. 152-64.

(Continued)

*Primary Examiner* — William Titcomb
(74) *Attorney, Agent, or Firm* — P. G. Scott Born; Richard T. Black; Foster Pepper PLLC

(57) ABSTRACT

A method implementable in at least one electronic device coupled to a network and a display device, includes receiving, over the network, a data set, receiving, from a user, a selection of a first topic, determining, based on the data set, a plurality of network sites hosting commentary of the first topic and an authority level of each site of the plurality, determining, based on the data set, an authority level of each site of the plurality, determining, based on the data set, a plurality of authors providing the commentary hosted by the plurality of network sites, determining, based on the data set, an authority level of each author of the plurality, determining, based on the data set, a value characterizing an opinion of each author on the first topic.

4 Claims, 17 Drawing Sheets

Related U.S. Application Data

No. 13/491,933, which is a continuation-in-part of application No. 11/745,390, filed on May 7, 2007, now Pat. No. 7,720,835, and a continuation-in-part of application No. PCT/US2007/068392, filed on May 7, 2007.

(60) Provisional application No. 60/998,730, filed on Oct. 11, 2007, provisional application No. 61/003,144, filed on Nov. 13, 2007, provisional application No. 61/072,776, filed on Apr. 1, 2008, provisional application No. 61/126,061, filed on Apr. 29, 2008, provisional application No. 60/965,067, filed on Aug. 15, 2007, provisional application No. 60/956,097, filed on Aug. 15, 2007, provisional application No. 60/746,621, filed on May 5, 2006, provisional application No. 60/861,406, filed on Nov. 27, 2006, provisional application No. 60/903,810, filed on Feb. 26, 207.

(51) Int. Cl.
  G06Q 10/06 (2012.01)
  G06Q 10/10 (2012.01)
  G06Q 30/02 (2012.01)
  H04N 21/84 (2011.01)

(56) References Cited

U.S. PATENT DOCUMENTS

| | | | |
|---|---|---|---|
| 6,515,681 B1 | 2/2003 | Knight | |
| 6,549,944 B1 | 4/2003 | Weinberg et al. | |
| 6,691,108 B2 | 2/2004 | Li | |
| 6,826,553 B1 | 11/2004 | DaCosta et al. | |
| 7,076,443 B1* | 7/2006 | Emens et al. | 705/14.55 |
| 7,185,065 B1 | 2/2007 | Holtzman et al. | |
| 7,188,078 B2 | 3/2007 | Arnett et al. | |
| 7,188,079 B2 | 3/2007 | Arnett et al. | |
| 7,310,612 B2* | 12/2007 | McQueen et al. | 705/26.61 |
| 7,788,086 B2* | 8/2010 | Corston-Oliver | G06F 17/274 704/1 |
| 7,788,087 B2* | 8/2010 | Corston-Oliver | G06F 17/274 704/10 |
| 7,822,631 B1* | 10/2010 | Vander Mey et al. | 705/7.29 |
| 2002/0010625 A1* | 1/2002 | Smith et al. | 705/14 |
| 2002/0038217 A1 | 3/2002 | Young | |
| 2002/0055940 A1* | 5/2002 | Elkan | G06F 17/30867 |
| 2002/0062368 A1 | 5/2002 | Holtzman et al. | |
| 2002/0107726 A1 | 8/2002 | Torrance et al. | |
| 2002/0198882 A1* | 12/2002 | Linden et al. | 707/10 |
| 2003/0048309 A1* | 3/2003 | Tambata | G01C 21/3664 715/810 |
| 2003/0233422 A1* | 12/2003 | Csaszar et al. | 709/206 |
| 2004/0078365 A1 | 4/2004 | Poltorak | |
| 2004/0140995 A1* | 7/2004 | Goldthwaite | H04N 5/45543 715/716 |
| 2004/0230511 A1* | 11/2004 | Kannan et al. | 705/35 |
| 2004/0254904 A1 | 12/2004 | Nelken et al. | |
| 2005/0033657 A1* | 2/2005 | Herrington et al. | 705/26 |
| 2005/0038717 A1* | 2/2005 | McQueen et al. | 705/27 |
| 2005/0132056 A1* | 6/2005 | Creamer et al. | 709/227 |
| 2005/0160107 A1 | 7/2005 | Liang | |
| 2005/0182768 A1 | 8/2005 | Waldorf et al. | |
| 2005/0273503 A1 | 12/2005 | Carr et al. | |
| 2006/0004716 A1 | 1/2006 | Hurst-Hiller et al. | |
| 2006/0004914 A1 | 1/2006 | Kelly et al. | |
| 2006/0041597 A1 | 2/2006 | Conrad et al. | |
| 2006/0075141 A1 | 4/2006 | Boxenhorn et al. | |
| 2006/0085248 A1 | 4/2006 | Arnett et al. | |
| 2006/0115108 A1 | 6/2006 | Rodriguez et al. | |
| 2006/0195461 A1 | 8/2006 | Lo et al. | |
| 2006/0200341 A1* | 9/2006 | Corston-Oliver | G06F 17/274 704/5 |
| 2006/0284873 A1 | 12/2006 | Forrest et al. | |
| 2006/0287989 A1 | 12/2006 | Glance | |
| 2007/0027932 A1 | 2/2007 | Thibeault | |
| 2007/0043617 A1 | 2/2007 | Stein et al. | |
| 2007/0050389 A1 | 3/2007 | Kim et al. | |
| 2007/0055612 A1 | 3/2007 | Palestrant et al. | |
| 2007/0100875 A1 | 5/2007 | Chi et al. | |
| 2008/0154883 A1* | 6/2008 | Chowdhury et al. | 707/5 |
| 2009/0089678 A1* | 4/2009 | Sacco et al. | 715/733 |

FOREIGN PATENT DOCUMENTS

| | | |
|---|---|---|
| UA | 20070100875 | 5/2007 |
| WO | 01-93155 A2 | 12/2001 |
| WO | 01/93155 A2 | 12/2001 |
| WO | 2006/019282 A1 | 2/2006 |

OTHER PUBLICATIONS

Oppermann BlogDesk Help, retrieved from Internet. http://www.blogdesk.org/en/blogdesk-help.pdf, archived at archive.org on Mar. 21, 2006, pp. 1-31.

"MaxQ is a Web Functional Testing Tool" Internet Citation, Jun. 1, 2004, XP009139079, URL:http://web.archive.org/web/20041229154236/hllp:l/maxq.tigris.org—retrieved Sep. 23, 2010.

* cited by examiner

FIG. 9

SYSTEMS AND METHODS FOR CONSUMER-GENERATED MEDIA REPUTATION MANAGEMENT

PRIORITY CLAIM

This application is a continuation of U.S. patent application Ser. No. 12/251,370 filed Oct. 14, 2008, now abandoned which claims priority to the following applications: U.S. Provisional Application Ser. No. 60/998,730 filed Oct. 11, 2007; U.S. Provisional Application Ser. No. 61/003,144 filed Nov. 13, 2007; U.S. Provisional Application Ser. No. 61/072,776 filed Apr. 1, 2008; and U.S. patent application Ser. No. 61/126,061 filed Apr. 29, 2008. All of the foregoing applications are hereby incorporated by reference in their entirety as if fully set forth herein.

This application is also a continuation-in-part of and claims priority to U.S. patent application Ser. No. 12/192,919 filed Aug. 15, 2008 now abandoned which claims priority to and the benefit of U.S. Provisional Application Ser. No. 60/965,067 filed Aug. 15, 2007 and U.S. Provisional Application Ser. No. 60/956,097 filed Aug. 15, 2007. This application is also a continuation-in-part of Ser. No. 11/745,390 filed May 7, 2007, now U.S. Pat. No. 7,720,835 and PCT Application Serial Number PCT/US07/68392 filed May 7, 2007 both of which claims priority to and the benefit of U.S. Provisional Application Ser. No. 60/746,621 filed May 5, 2006, U.S. Provisional Application Ser. No. 60/861,406 filed Nov. 27, 2006, and U.S. Provisional Application Ser. No. 60/903,810 filed Feb. 26, 2007. All of the foregoing applications are hereby incorporated by reference in their entirety as if fully set forth herein.

COPYRIGHT NOTICE

This disclosure is protected under United States and International Copyright Laws. © 2006-2008 Visible Technologies LLC. All Rights Reserved. A portion of the disclosure of this patent document contains material which is subject to copyright protection. The copyright owner has no objection to the facsimile reproduction by anyone of the patent document or the patent disclosure after formal publication by the USPTO, as it appears in the Patent and Trademark Office patent file or records, but otherwise reserves all copyright rights whatsoever.

BACKGROUND OF THE INVENTION

The Internet and other computer networks are communication systems. The sophistication of this communication has improved and the primary modes differentiated over time and technological progress. Each primary mode of online communication varies based on a combination of three basic values: privacy, persistence, and control. Email as a communications medium is private (communications are initially exchanged only between named recipients), persistent (saved in inboxes or mail servers) but lacks control (once you send the message, you can't take it back, or edit it, or limit re-use of it). Instant messaging is private, typically not persistent (although some newer clients allow users to save history, so this mode is changing) and lacks control. Message boards are public (typically all members, and often all Internet users, can access your message) persistent, but lack control (they are typically moderated by a central owner of the board). Chat rooms are public (again, some are membership based) typically not persistent, and lack control.

|  | privacy | persistence | author control |
|---|---|---|---|
| Chat Rooms/IRC | no | no | no |
| Instant Messaging | yes | no | no |
| Forums | no | yes | no |
| Email | yes | yes | no |
| Blogs | no | yes | yes |
| social networks | yes/no | yes | yes |
| Second Life | yes | yes | yes+ |

Blogs and Social Networks are the predominant communications mediums that permit author control. By reducing the cost, technical sophistication, and experience required to create and administer a web site, blogs and other persistent online communication have given an unprecedented amount of editorial control to millions of online authors. This has created a unique new environment for creative expression, commentary, discourse, and criticism without the historical limits of editorial control, cost, technical expertise, or distribution/exposure.

There is significant value in the information contained within this public media. Because the opinions, topics of discussion, brands and celebrities mentioned and relationships evinced are typically unsolicited, the information presented, if well studied, represents an amazing new source of social insight, consumer feedback, opinion measurement, popularity analysis and messaging data. It also represents a fully exposed, granular network of peer and hierarchical relationships rich with authority and influence. The marketing, advertising, and PR value of this information is unprecedented.

This new medium represents a significant challenge for interested parties to comprehensively understand and interact with. As of Q1 2007 estimates for the number of active, unique online CGM sites (forums, blogs, social networks, etc.) range from 50 to 71 million, with growth rates in the hundreds of thousands of new sites per day. Compared to the typical mediums that PR, Advertising and Marketing businesses and divisions interact with (<1000 TV channels, <1000 radio stations, <1000 major news publications, <10-20 major pundits on any given subject, etc.) this represents a nearly 10,000-fold increase in the number of potential targets for interaction.

Businesses and other motivated communicators have come to depend on software that perform Business Intelligence, Customer Relationship Management, and Enterprise Resource Planning tasks to facilitate accelerated, organized, prioritized, tracked and analyzed interaction with customers and other target groups (e.g., voters, consumers, pundits, opinion leaders, analysts, reporters, and others). These systems have been extended to facilitate IM, E-mail, and telephone interactions. These media have been successfully integrated because of standards (e.g., JABBER, POP3, SMTP, POTS, IMAP, and others) that require that all participant applications conform to a set data format that allows interaction with this data in a predictable way.

Blogs and other CGM generate business value for their owners, both on private sites that use custom or open source software to manage their communications, and for large public hosting entities. Because these sites generate advertising revenue by pulling users into the site, author/owners attempt to protect the content on these sites, so that readers/subscribers/peers have to visit the site, in order to participate in/observe the communication. Thus there is no financial incentive to make the content wholly available to the public and as a result there is no unifying standard for blogs which contains complete data. RSS and Atom feeds allow structured communication of some portion of the communication on sites, but are often incomplete representations of the data, available on a given site. Sites also protect their content from being "stolen" by automated systems with an array of CAPTCHAs, ("Completely Automated Public Turing test to tell Computers and Humans Apart") email verification, mobile phone text message verification, password authentication, cookie tracking, Uniform Resource Locator (URL) obfuscation, timeouts and Internet Protocol (IP) address tracking.

The result is a massively diverse community that it would be very valuable to understand and interact with, which resists aggregation and unified interaction by way of significant technical diversity, resistance to complete information data standards, and tests that attempt to require one-to-one human interaction with content.

BRIEF DESCRIPTION OF THE DRAWINGS

The preferred and alternative embodiments of the present invention are described in detail below with reference to the following drawings.

Figure 9:
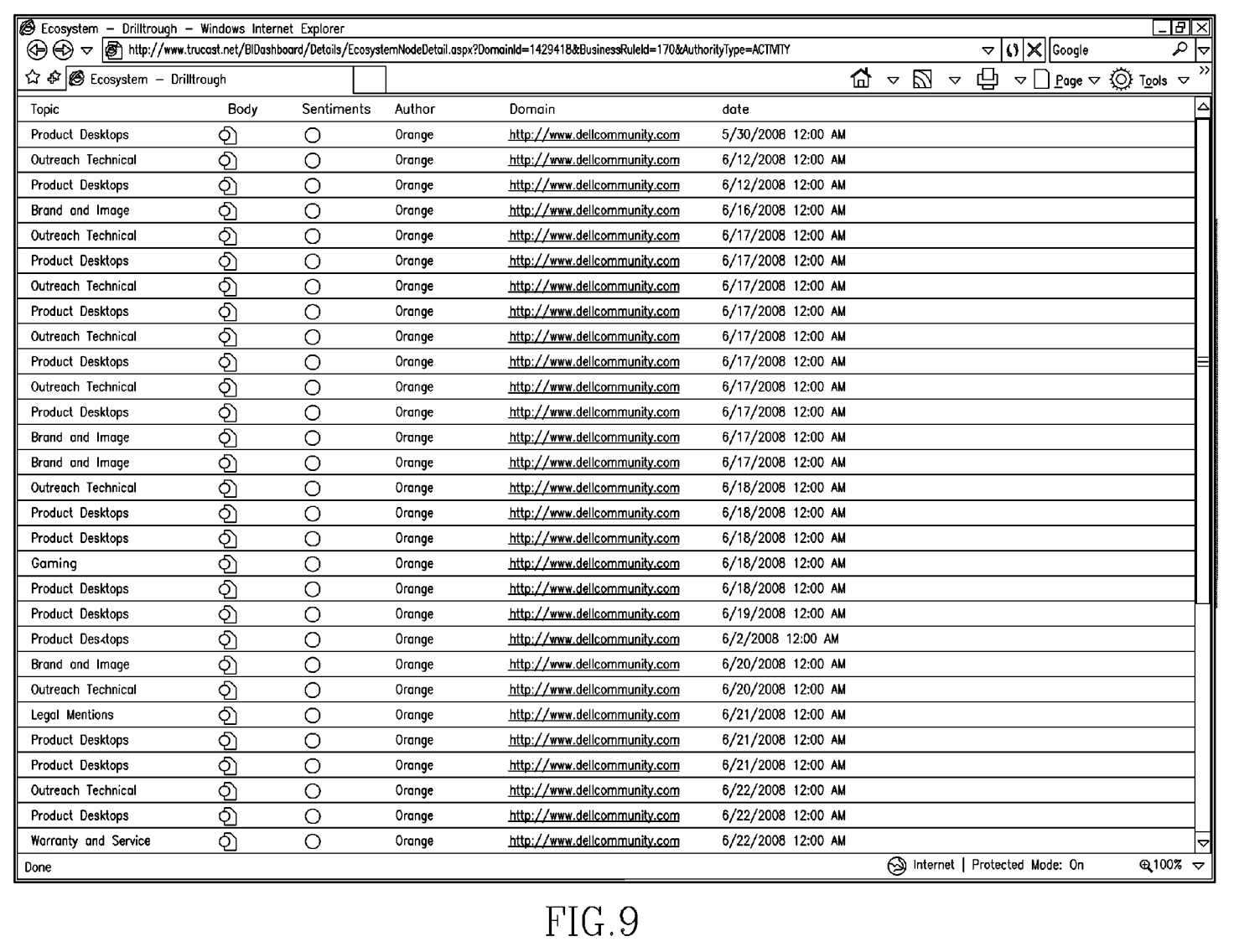

FIGS. 5-9 illustrates features of an authority map according to an embodiment of the invention;

DETAILED DESCRIPTION OF THE PREFERRED EMBODIMENT

Figure 1:
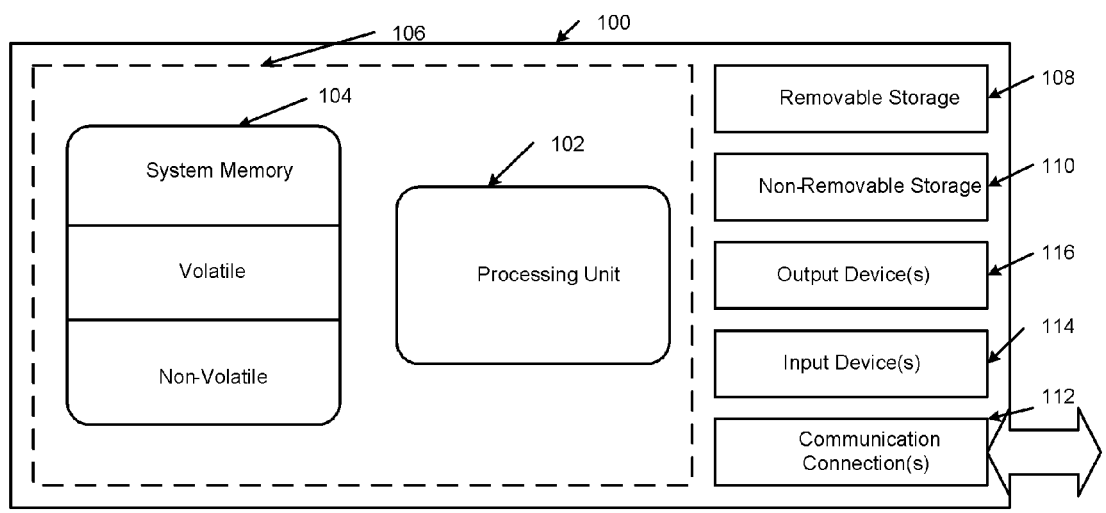
FIGS. 1-2 shows an exemplary system for consumer generated media reputation management according to an embodiment.

FIG. 1 illustrates an example of a suitable computing system environment 100 on which an embodiment of the invention can be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general-purpose or special-purpose computing-system environments or configurations. Examples of well-known computing systems, environments, and/or configurations that can be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed-computing environments that include any of the above systems or devices, and the like.

Embodiments of the invention can be described in the general context of computer-executable instructions, such as program modules, being executed by a computer. Generally, program modules include routines, programs, objects, components, data structures, etc., that perform particular tasks or implement particular abstract data types. Embodiments of the invention can also be practiced in distributed-computing environments where tasks are performed by remote processing devices that are linked through a communications network. In a distributed-computing environment, program modules can be located in both local- and remote-computer storage media including memory storage devices.

With reference to FIG. 1, an exemplary system for implementing an embodiment of the invention includes a computing device, such as computing device 100. In its most basic configuration, computing device 100 typically includes at least one processing unit 102 and memory 104.

Depending on the exact configuration and type of computing device, memory 104 can be volatile (such as random-access memory (RAM)), non-volatile (such as read-only memory (ROM), flash memory, etc.) or some combination of the two. This most basic configuration is illustrated in FIG. 1 by dashed line 106.

Additionally, device 100 can have additional features/functionality. For example, device 100 can also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media can be part of device 100.

Device 100 can also contain communications connection(s) 112 that allow the device to communicate with other devices. Communications connection(s) 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF), infrared and other wireless media. The term computer-readable media as used herein includes both storage media and communication media.

Device 100 can also have input device(s) 114 such as keyboard, mouse, pen, voice-input device, touch-input device, etc. Output device(s) 116 such as a display, speakers, printer, etc. can also be included. All such devices are well-known in the art and need not be discussed at length here.

Figure 2:
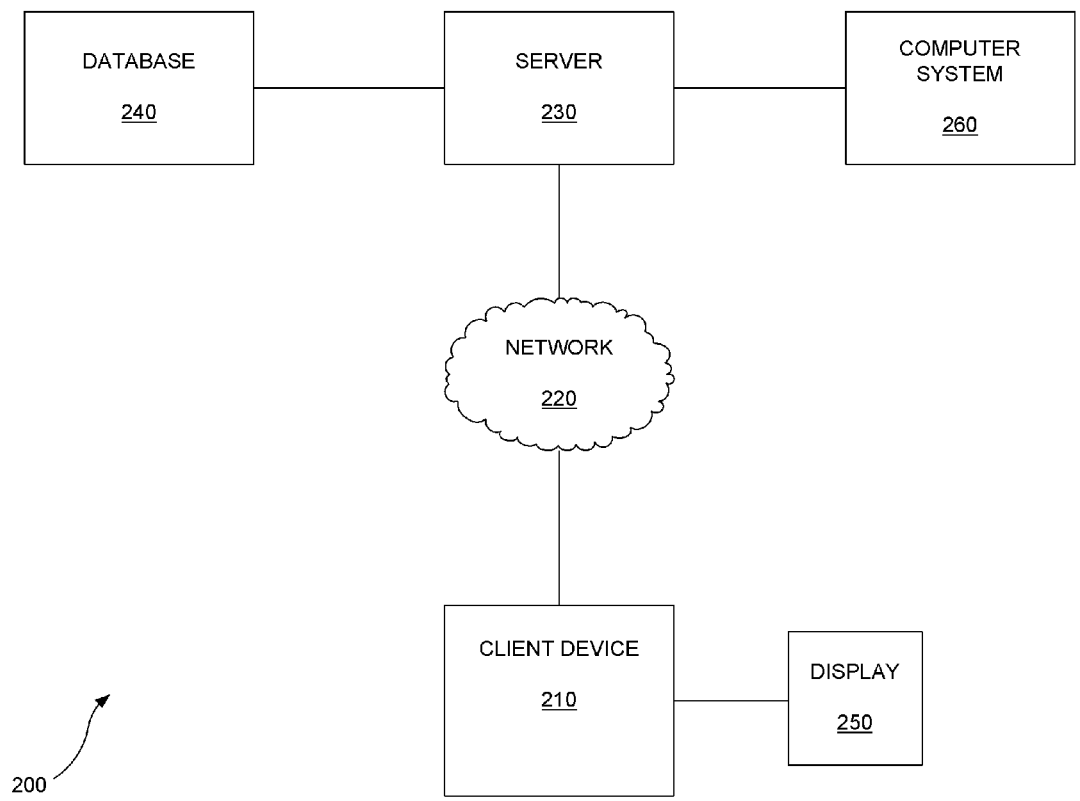

Referring now to FIG. 2, an embodiment of the present invention can be described in the context of an exemplary computer network system 200 as illustrated, System 200 includes an electronic client device 210, such as a personal computer or workstation, that is linked via a communication medium, such as a network 220 (e.g., the Internet), to an electronic device or system, such as a server 230. The server 230 can further be coupled, or otherwise have access, to a database 240 and a computer system 260. Although the embodiment illustrated in FIG. 2 includes one server 230 coupled to one client device 210 via the network 220, it should be recognized that embodiments of the invention can be implemented using one or more such client devices coupled to one or more such servers.

In an embodiment, each of the client device 210 and server 230 can include all or fewer than all of the features associated with the device 100 illustrated in and discussed with reference to FIG. 1. Client device 210 includes or is otherwise coupled to a computer screen or display 250. As is well known in the art, client device 210 can be used for various purposes including both network- and local-computing processes.

The client device 210 is linked via the network 220 to server 230 so that computer programs, such as, for example, a browser, running on the client device 210 can cooperate in two-way communication with server 230. Server 230 can be coupled to database 240 to retrieve information therefrom and to store information thereto. Database 240 can include a plurality of different tables (not shown) that can be used by server 230 to enable performance of various aspects of embodiments of the invention. Additionally, the server 230 can be coupled to the computer system 260 in a manner allowing the server to delegate certain processing functions to the computer system.

In at least one embodiment, methods and systems are implemented by a coordinated software and hardware computer system. This system can include a set of dedicated networked servers controlled by an embodiment. The servers can be installed with a combination of commercially available software, custom configurations, and custom software. A web server is one of those modules, which exposes a web based client-side user interface (UI) to customer web browsers. The UI interacts with the dedicated servers to deliver information to users. The cumulative logical function of these systems results in a system and method of an embodiment.

In alternate embodiments, the servers could be placed client side, could be shared or publicly owned, could be located together or separately. The servers could be the aggregation of non-dedicated compute resources from a Peer to Peer (P2P), grid, or other distributed network computing environments. The servers could run different commercial applications, different configurations with the same or similar cumulative logical function. The client to this system could be run directly from the server, could be a client side executable, could reside on a mobile phone or mobile media device, could be a plug-in to other Line of Business applications or management systems. This system could operate in a client-less mode where only Application Programming Interface (API) or eXtensible Markup Language (XML) or Web-Services or other formatted network connections are made directly to the server system. These outside consumers could be installed on the same servers as the custom application components. The custom server-side engine applications could be written in different languages, using different constructs, foundations, architectural methodologies, storage and processing behaviors while retaining the same or similar cumulative logical function. The UI could be built in different languages, using different constructs, foundations, architectural methodologies, storage and processing behaviors while retaining the same or similar cumulative logical function.

Figure 3:
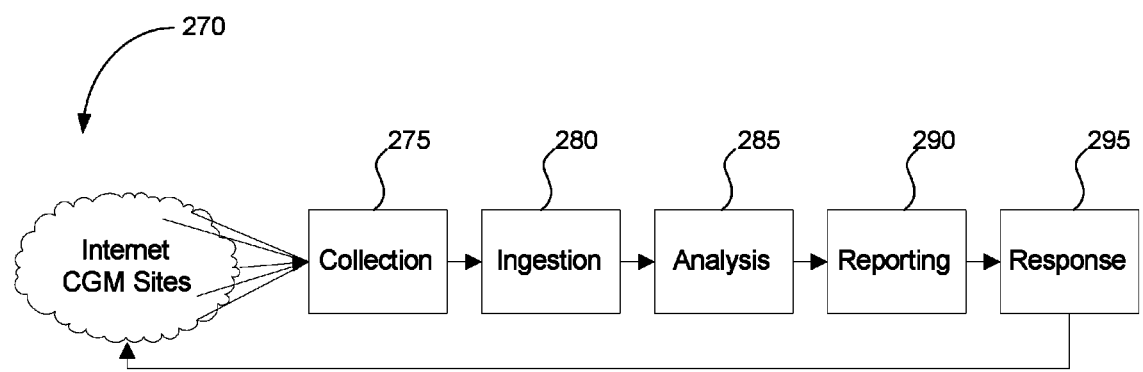
FIG. 3 shows a system for consumer generated media influence and sentiment determination according to an embodiment of the invention.

FIG. 3 shows a system within which can be implemented a method for consumer-generated media influence and sentiment determination. The system can be broken down into a set of modules. The modules can include without limitation the following: collection module 275 that receives data from Internet CGM sites 270, ingestion module 280, analysis module 285, reporting module 290 and response module 295, which can provided feedback data back to sites 270, as described in greater detail below herein.

Embodiments of the invention can be described in the context of one or more ecosystems. An "ecosystem" in the context of the present application can describe online personas and sites (an Internet site which contains CGM content) of their interactions that can be further described by how the interactions occur, the topics of those interactions, the frequency of interactions, and the like.

Figure 4:
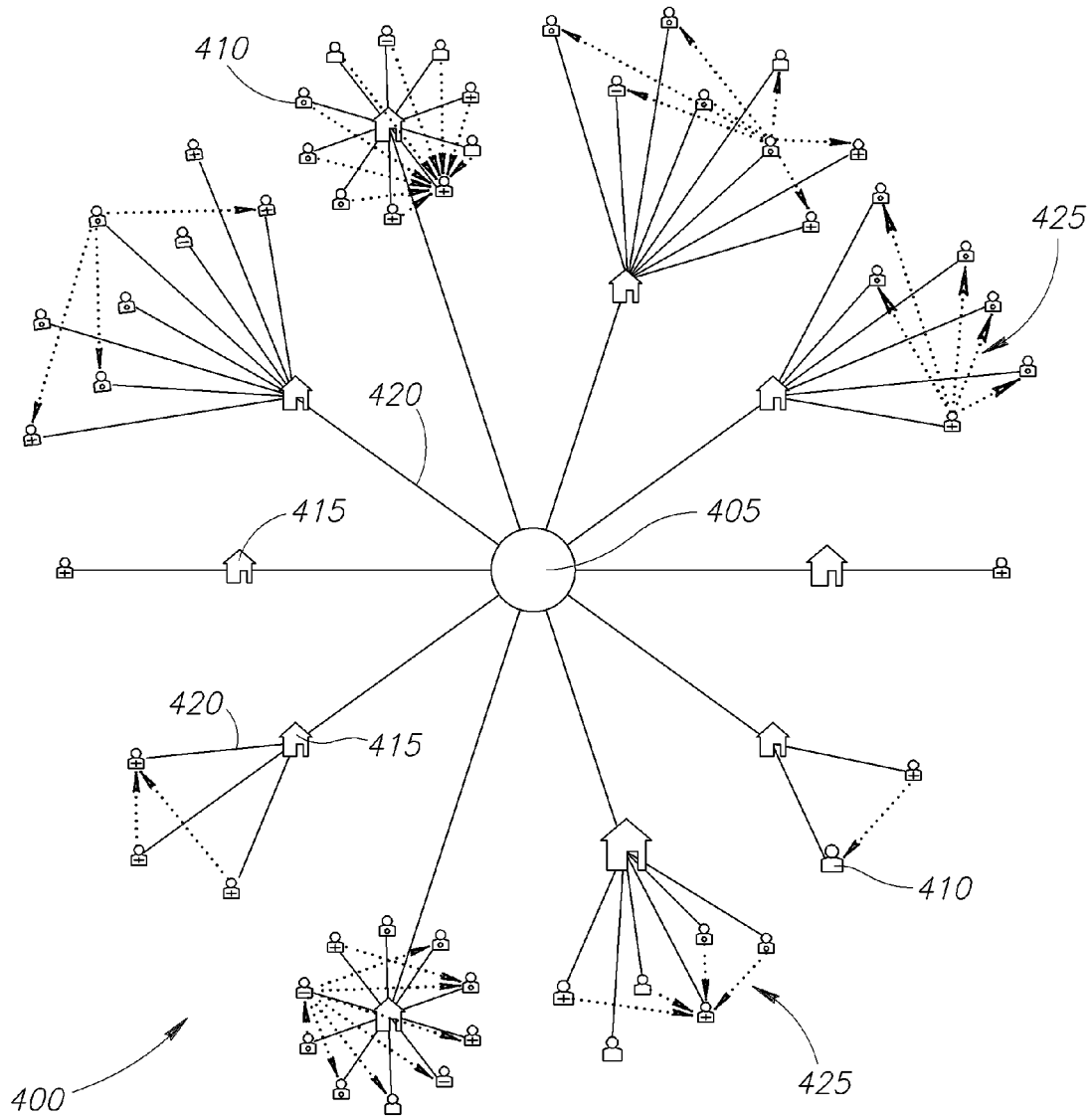
FIG. 4 illustrates an authority map according to an embodiment of the invention.

In an embodiment, and referring now to FIG. 4, an authority map 400 is illustrated, which can be displayed within a graphical user interface (not shown) on the display device 250. The authority map 400 is a tool for identifying and understanding the authors, associated with a specified topic of interest, that matter to a particular entity using such an embodiment. In the illustrated embodiment, the displayed authority map 400 shows an icon 405 representing a topic being analyzed, which, as illustrated, can be displayed as a hub of a hub-and-spoke configuration, along with a textual description of the topic. Also displayed are icons 410 representing authors of varying levels of authority or perceived influence (discussed in greater detail below herein) who have commented or otherwise posted an opinion on the displayed topic. These icons 410 can further include a domain identifier associated with the author, as illustrated. Also displayed are icons 415 representing sites of varying levels of authority or perceived influence (discussed in greater detail below herein) hosting conversations involving those authors and the displayed topic. These icons 415 can further include a domain identifier associated with the site, as illustrated.

In an embodiment, each of the icons 410, 415 can be presented in a distinguishing format to indicate varying levels of authority/influence, and/or prevailing opinion or sentiment on the topic, associated with authors and sites. For example, size of the icons 410, 415 can correspond to authority/influence of the respective author or site: bigger for more authoritative, smaller for less authoritative. Color, shading or pattern type of the icons 410, 415 can correspond to prevailing sentiment (e.g., green for positive, red for negative, grey for neutral, and orange for mixed). Lines 420 connect the icons 410 of authors to the icons 415 of sites that host them, and from the site icons to the topic icon 405 at the center. Dotted (or other distinguishing) lines 425 represent conversations or other connections occurring between authors. In an embodiment, arrows at the ends of the dotted lines 425 show the direction of interaction, pointing, for example, from commenter to original post author.

Figure 5:
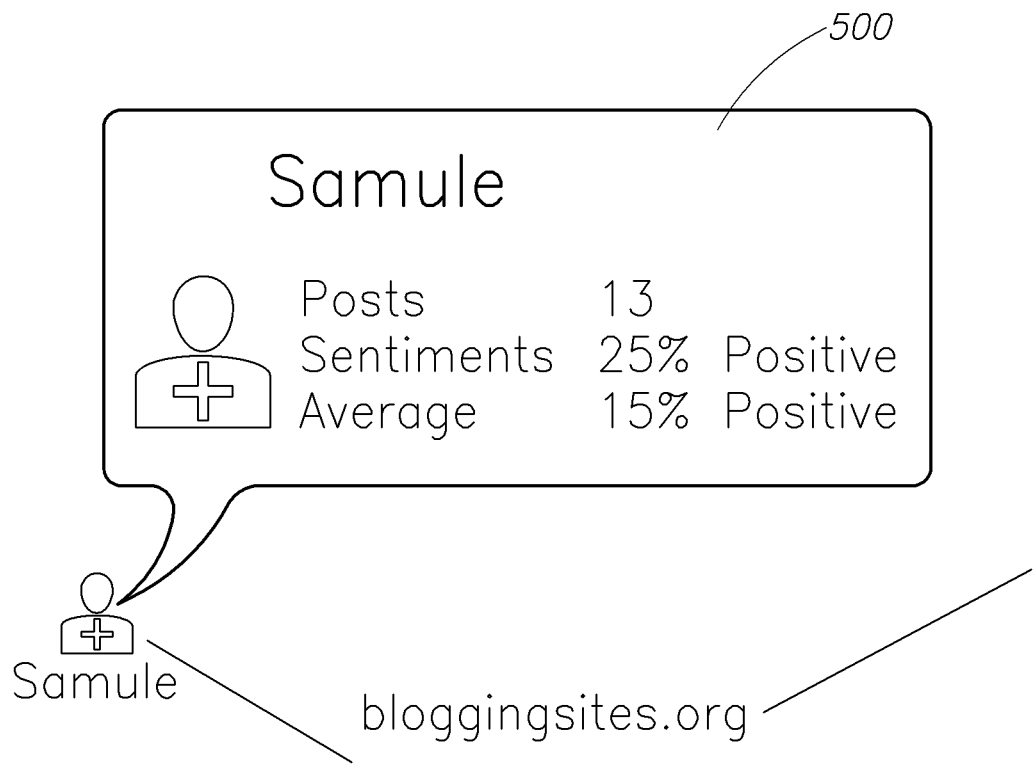
Figure 6:
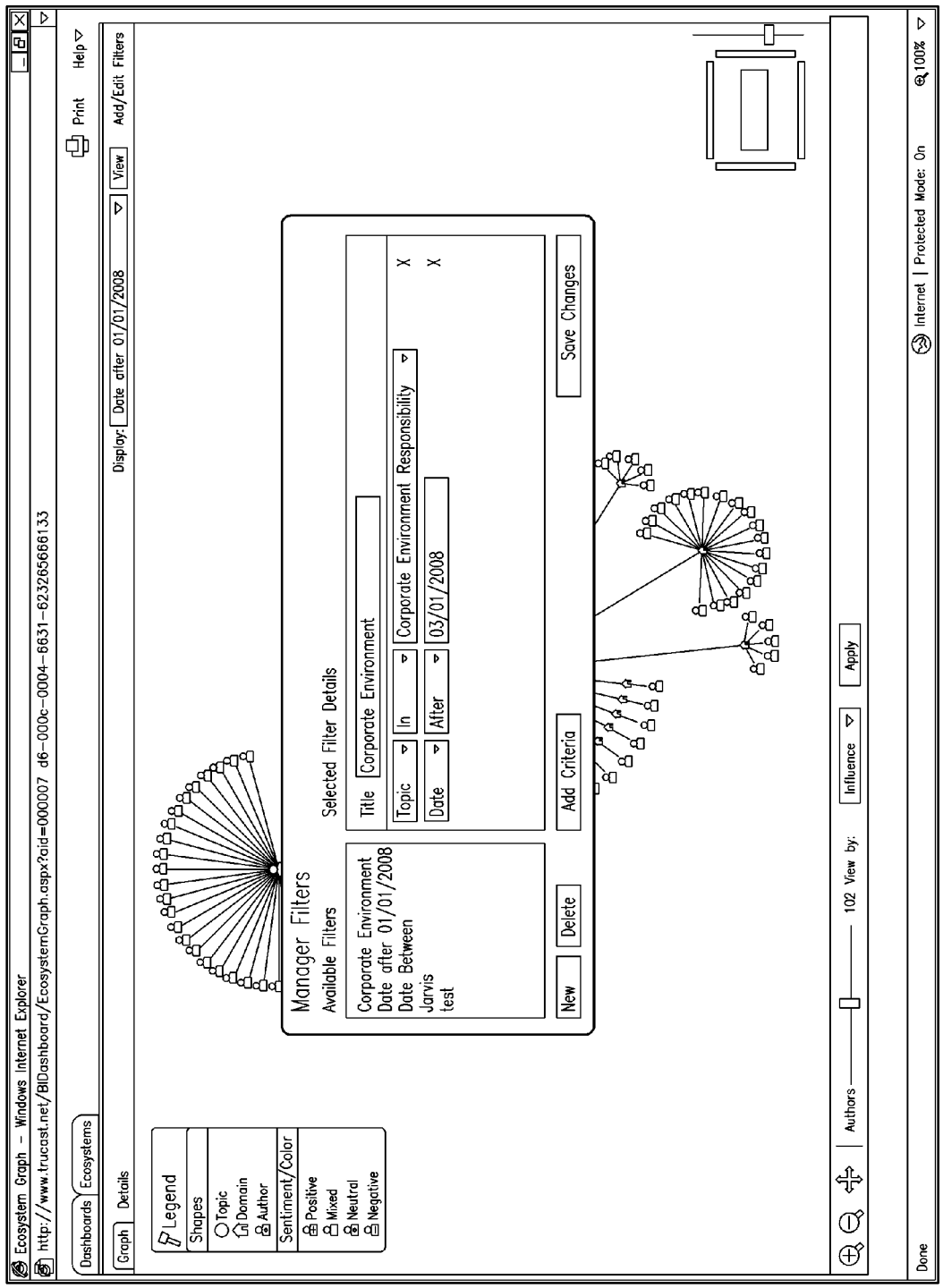
Figure 7:
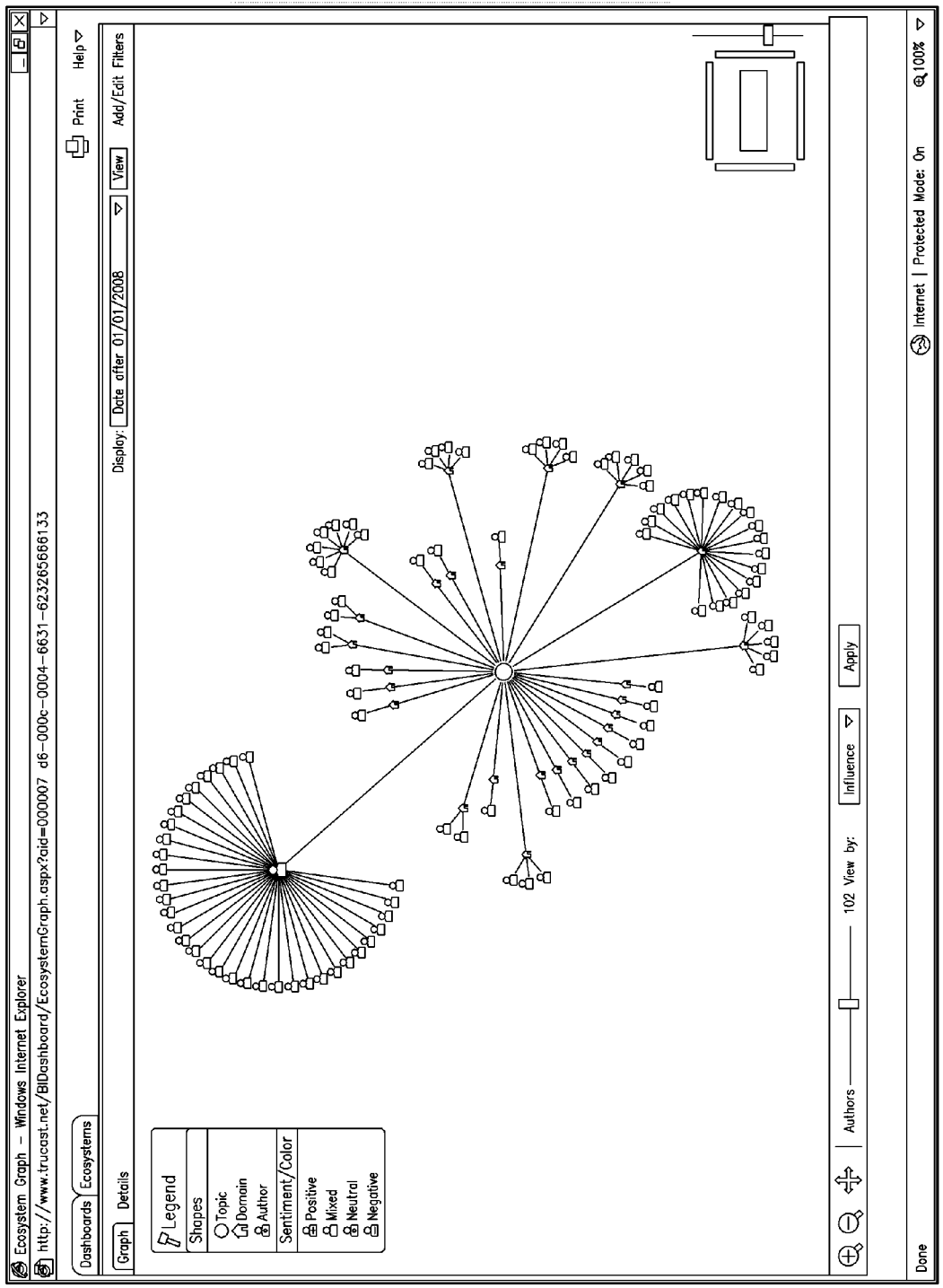
Figure 8:
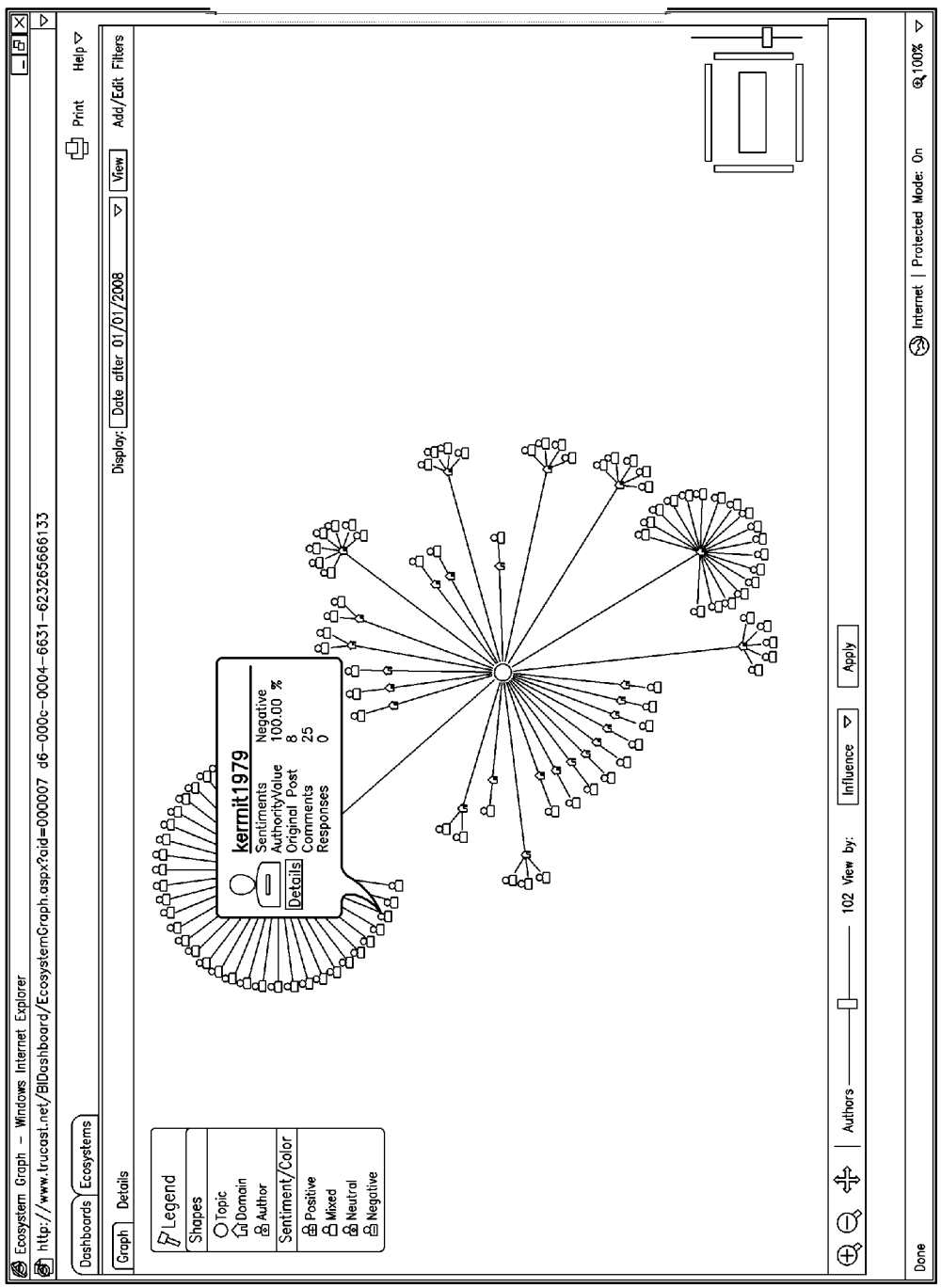

To populate the map 400, a criteria panel (not shown), such as a pull-down menu, for example, can be used to select the topic of interest. The interface allows a user to get additional information about any of the nodes (icons associated with authors, sites, and topics) on the display 250. For example, and referring to FIG. 5, a small pop-up window 500 with additional detail about that node can appear. The display can allow a user, for example, to promote or "pin" nodes that are of interest, which makes those items larger on the screen.

Further included within an embodiment of the authority map is a series of calculations. For example, in an embodiment, the magnitude of author authority can be calculated based on data representing the topic selected by the user, using the conversations between authors and the activity generated by the commentary of a particular author (e.g., the number of comments posted in response to a comment by the author) to evaluate the author's authority. This data can be calculated or otherwise determined by execution of computer-executable instructions, by human analysis, and/or some combination of both types of approaches.

The magnitude of site authority can be defined or otherwise determined in a manner similar to that used to determine the magnitude of author authority. Data, representing content pertaining to a particular topic can be determined to have been written or otherwise produced by someone at a site. As such, a site which has a predetermined threshold number of comments pertaining to a particular topic can be, for example, determined to be an authoritative site. The magnitude of the authority of these sites can then be determined based on, for example, the amount or volume of comments pertaining to the topic in question and associated with each respective site. This data can be calculated or otherwise determined by execution of computer-executable instructions, by human analysis, and/or some combination of both types of approaches.

Sentiment can be calculated by a weighted metric on the overall sentiment distribution, which, for example, can favor "sentimented" values over neutral values. In a hypothetical example a weighted ratio of four to one can be given to rank sentimented values over neutral values. This ranking can ensure that a user is receiving information characterized and based on an authors sentiment on the user selected topic. Counts or totals, for example can be reflective of the on-topic conversations and based on the topic of interest chosen. For example, if an author has written 200 posts, but only 5 are about the topic the user is interested in, the ranking calculation can be based on the those 5. In this embodiment the user can set the context in order to identify authorities in limited to that context.

Further included within an embodiment of the authority map is a series of calculations. Raw data is aggregated, processed, and analyzed in several ways. Posts, referring to CGM content (e.g., weblog postings, comments, forum replies, a product review, and the like) can be matched to one or more topics of interest using, for example keyphrase definitions including a word, string of words, or groups of words with Boolean modifiers that are used as models for discovering CGM content that might be relevant to a given topic. For each topic matched, a sentiment can be assigned, for example, by using manual attribution or computational attribution. Computational attribution of sentiment can be achieved by correlating patterns from a set of known pieces of content that represent the sentiment for a topic to the individual piece of content being analyzed. For example, an embodiment can use text parsing in conjunction with Bayesian inference to assign a probability that a post exists within neutral or sentimented "states." Each state can be represented by a definition derived from groups of posts that are characteristic of that state. The comparison can be done using the state definitions that can be stored in an index resident on the client device 210 and/or server 230 and/or database 240 and comparing that state definition with the content in question. In alternative embodiments, or additionally, keywords, keyphrases, and/or keysentence recognition, referring, for example to a word, string of words, and/or groups of words with Boolean modifiers that are used as models for discovering CGM content that might be relevant to a given topic, can be used in conjunction with an index. The index can be used to correlate sentiment value with a particular or group of keywords, keyphrase, and keysentences to determine an author's opinion on a topic.

In an exemplary embodiment, when displaying an author and/or site's sentiment in the Authority Map, the dominant sentiment can be calculated, and ranked by a weighted metric on the overall sentiment distribution across all posts that match the topic being analyzed, weighting "sentimented" values over neutral values. For ranking authors, for example, the posts can be matched by topic and/or contributed by an author of interest. For ranking sites, for example, the posts can be matched by topic and/or contributed at a site of interest. An author's and/or a site's authority ranking can be calculated based on data representing topics selected by the user, using the engagement, interactions, and/or conversations between authors and the activity (e.g., post counts). Therefore, calculations reflect the on-topic conversations, computed relative to the topic ecosystem and/or context being analyzed. For example, if an author has written 200 posts, but only 5 are on topic, the calculation will use the 5 contextually relevant posts in the ranking calculation. In this embodiment, the user can set the context in order to identify authorities limited to that context.

Referring to FIGS. 6-9, embodiments of an authority map can include but is not limited to the following features: single topic representation with a topic selector for context; color-coded sentiment visualization rolled up to Authors and Sites; authority represented by icon size; topic-site linkage; site-author linkage; author-author linkage; mouse-over tool tip with data stats Alternative embodiments can include, but are not limited to a sliding scale to allow user to choose the number of authors displayed; date and site domain filters; data drill down capabilities that allows users to view the data behind the calculations.

In one embodiment an active conversation feature enables users to participate with different content providing authors, for example, bloggers, based on the content providing author's thread, question string, issue resolution, and/or the like, wherein such responsive media can include but is not limited to posting comments on a user's behalf, collecting follow-up comments from a blog and bringing those comments to the user, enabling users to interact, and/or providing management of the interaction cycle in a Workflow Manager. This embodiment is shown in FIG. 10.

Figure 10:
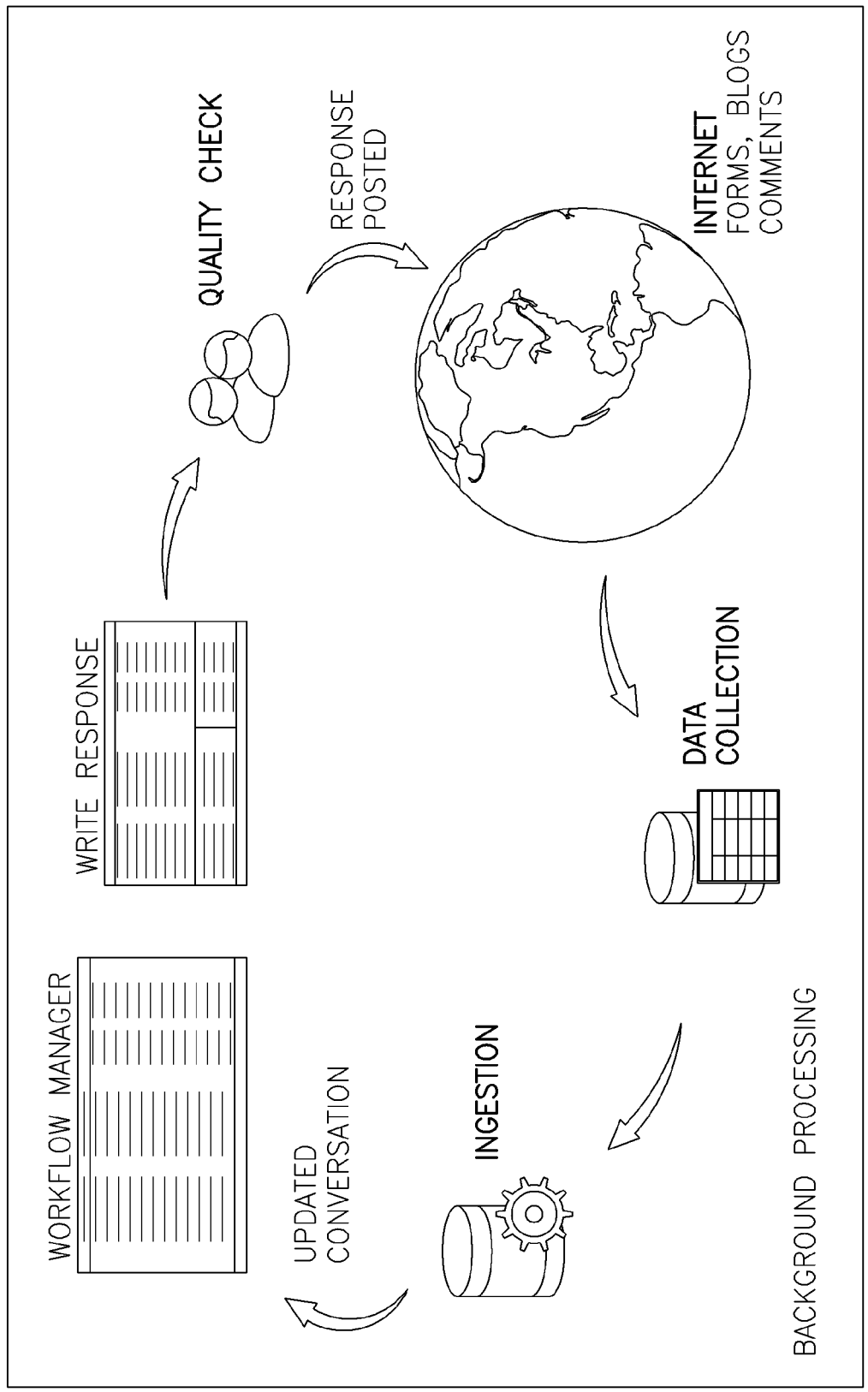
FIGS. 10 illustrates one embodiment of an active conversation feature.
Figure 11:
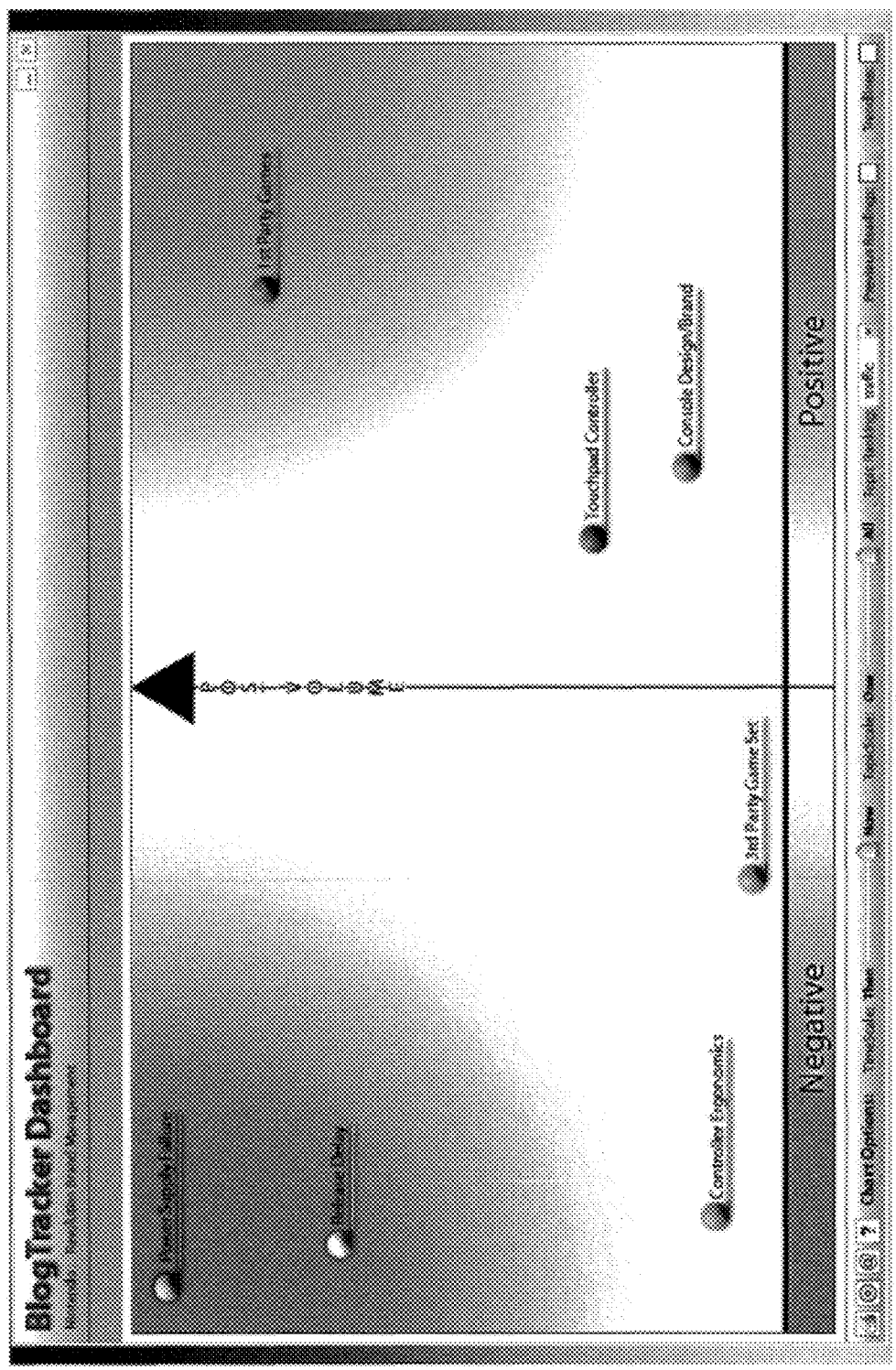
FIGS. 11-17 are screenshots illustrating one or more embodiments of the invention.
Figure 12:
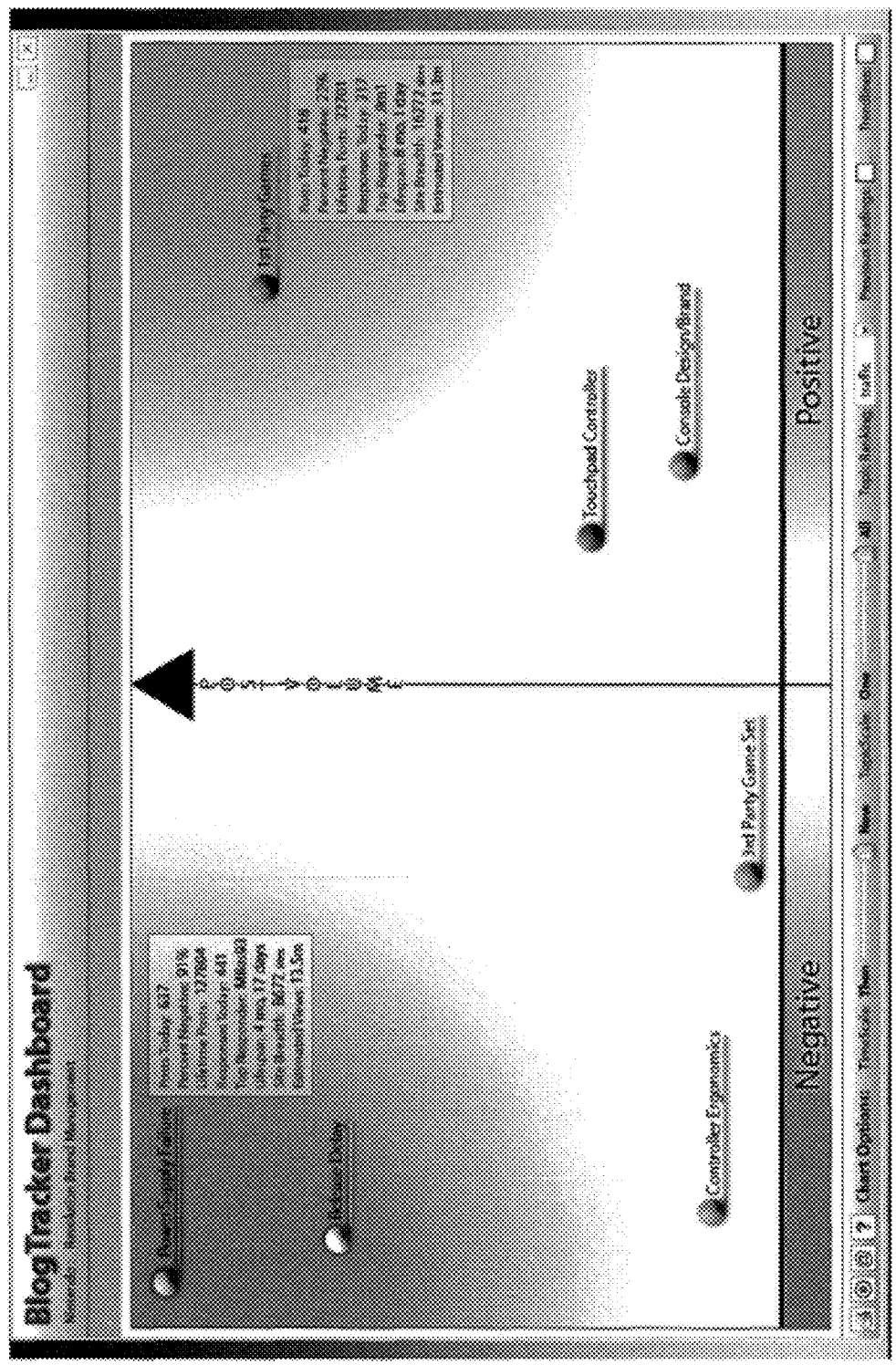
Figure 13:
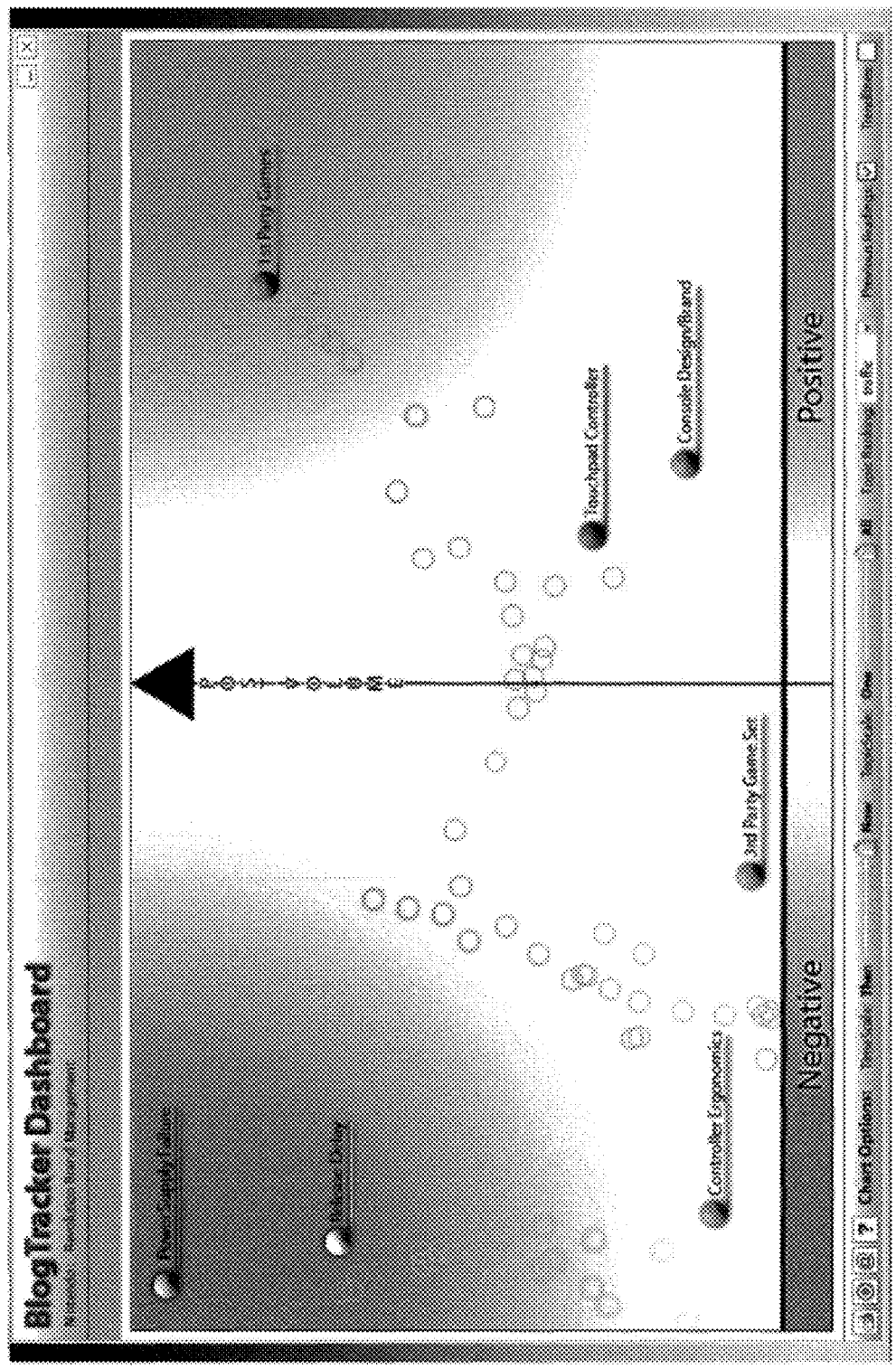
Figure 14:
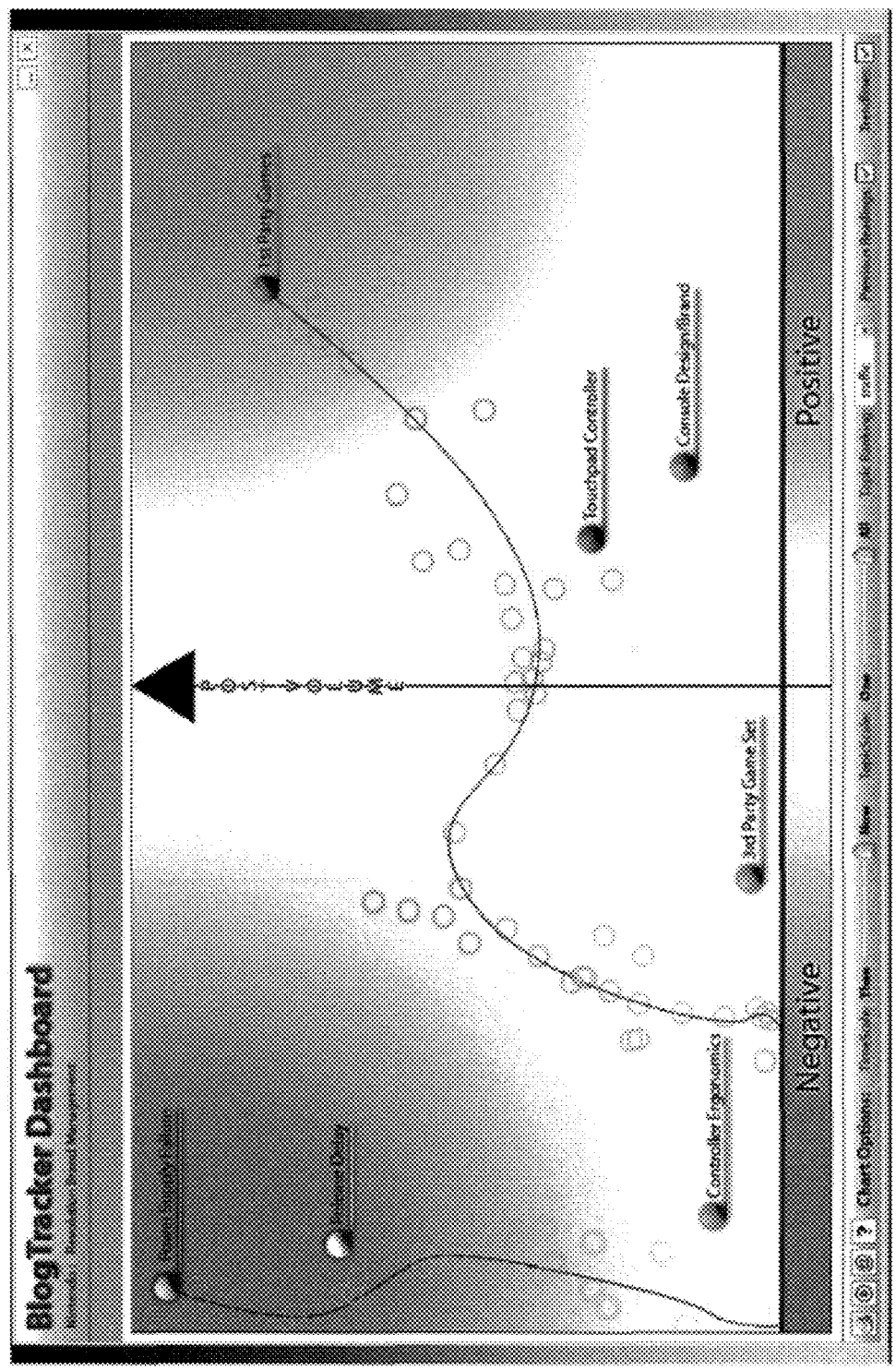
Figure 15:
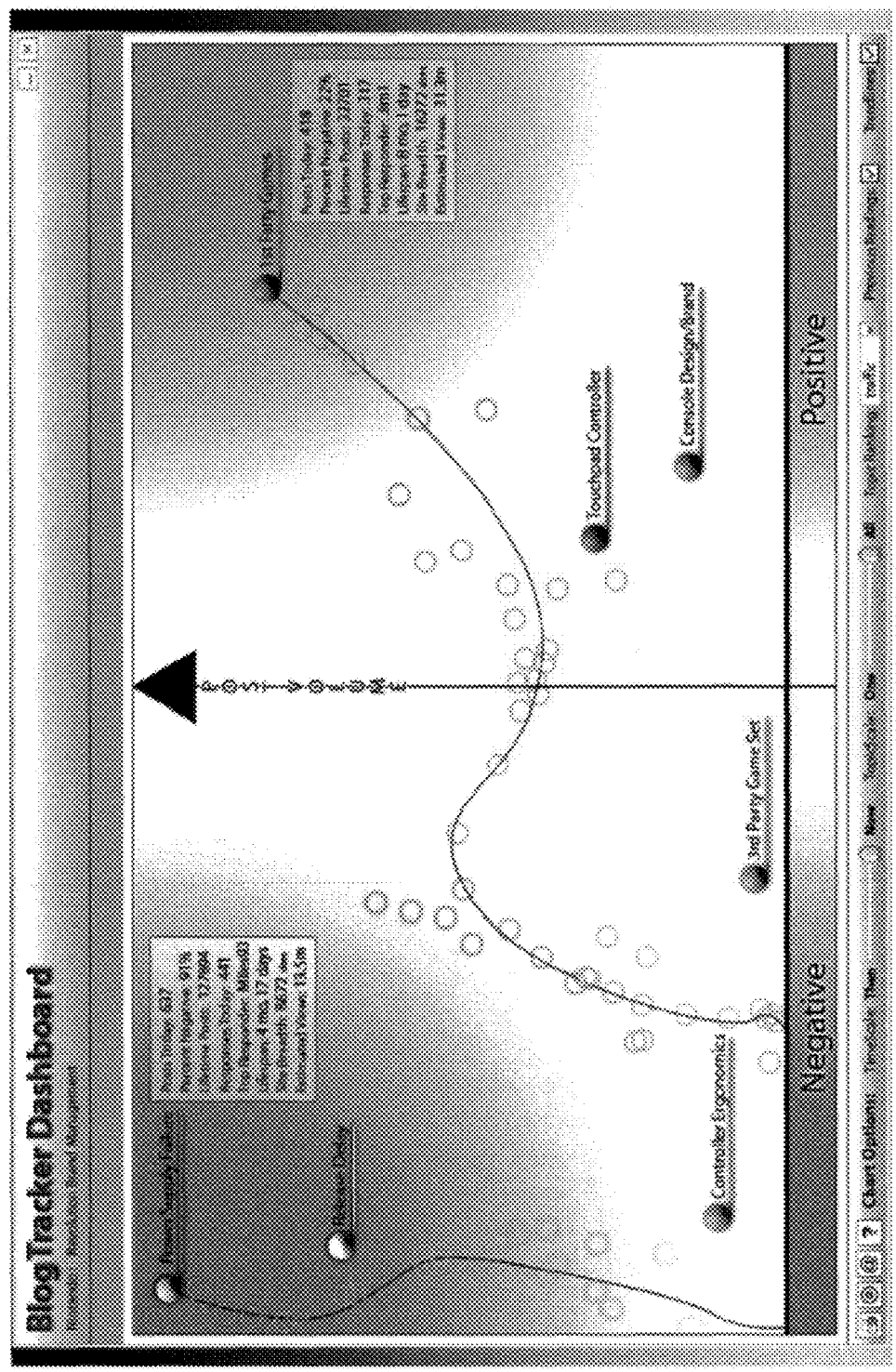
Figure 16:
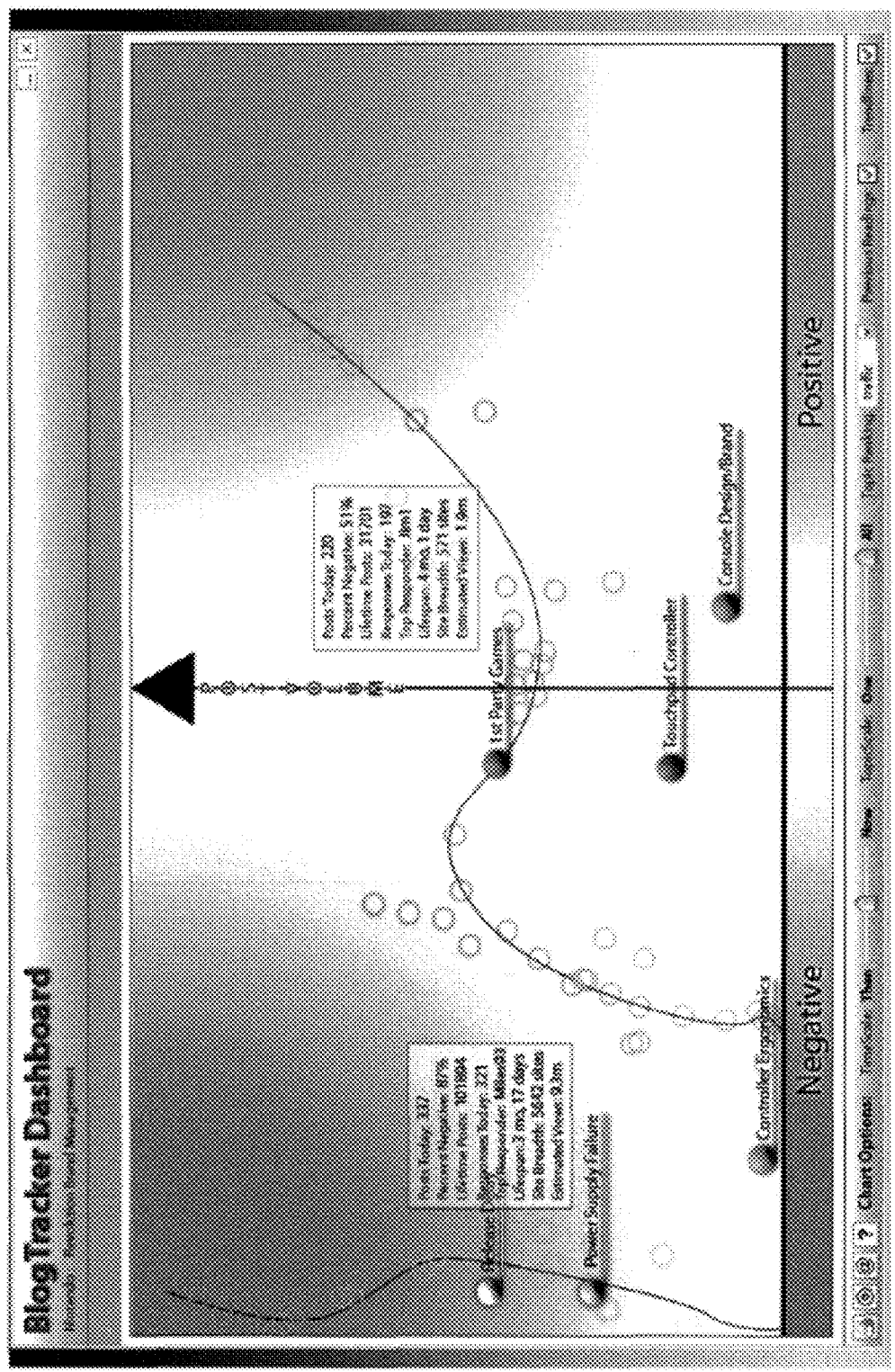
Figure 17:
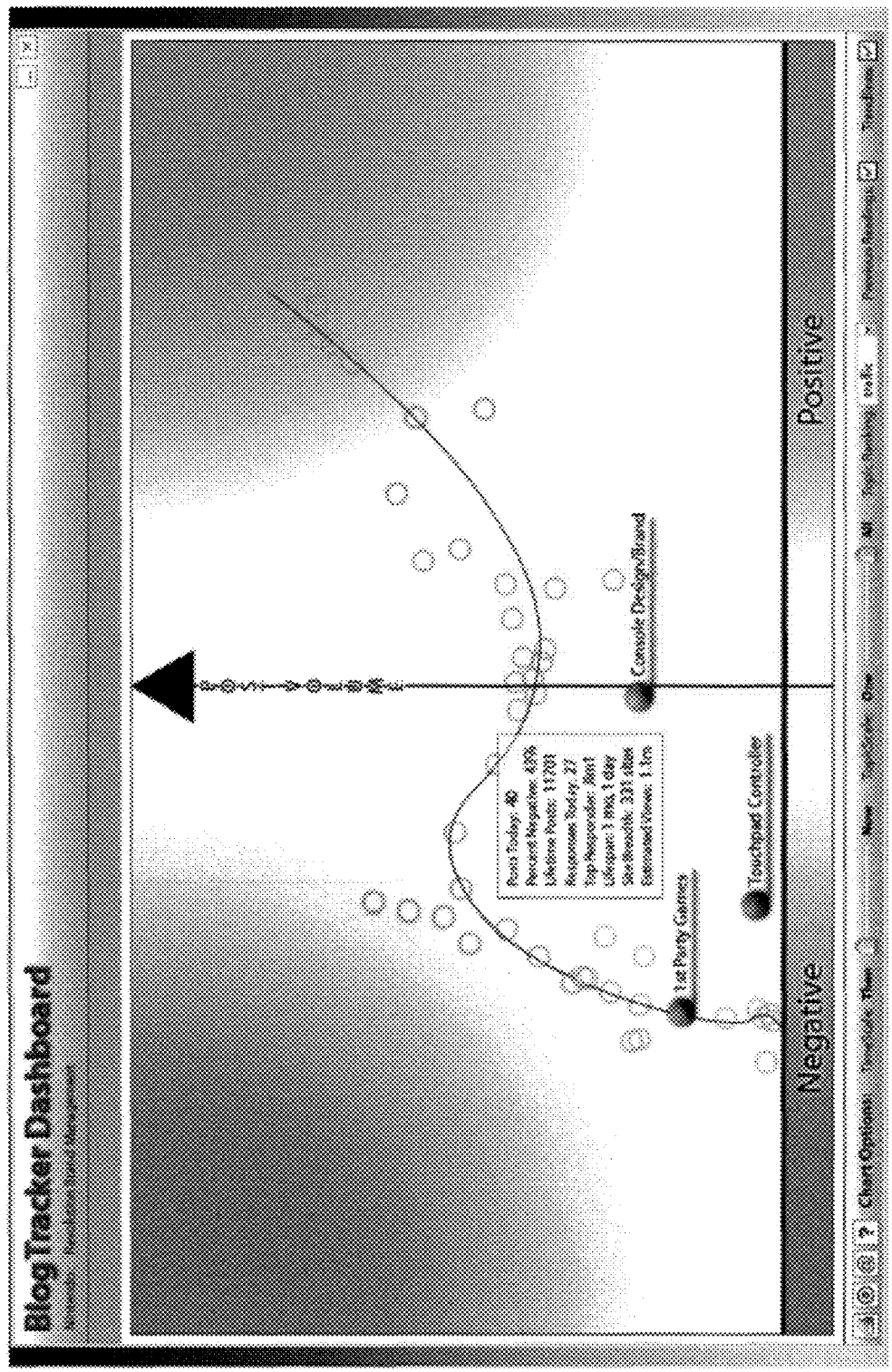

Referring to FIG. 10, one embodiment includes integration with business process and analytics. An Engagement Manager and/or Workflow Manager can be tailored to focus on the operational activities of identifying, engaging, and responding to and/or with actionable posts, as well as managing the interaction between the user and the authors providing content. In another embodiment, the Engagement Manager can manage a working group of users. For example, actionable posts can be allocated to certain users within the working group, thus directing the working group through the workspace based on the context and returned results. In one embodiment, batch actions relate to handling large amounts of similar data. For example, in situations where content volume is typically large, users can apply general rules that identify groups of posts for further action. For example, users can consider specific Site Domains as non-actionable; specific authors as owned relationships for one member of the working group; and/or tasks can be divided and distributed between individuals in a working group, for example, large numbers of posts can be moved to individual members for detailed review. For example, in operation an action can be to assign and/or close a large group of posts for individual line item review by a specific team member. To facilitate these actions, administrator can be given the authority to select a number of posts so that when a group of posts is selected, the administrator can preferably choose to bulk archive or bulk assign the selection. Alternative embodiments provide users with the same capability.

In another embodiment a Rules Manager permits assignment of one or more rules to one user. A user may manually analyze content by prioritizing rules that create groups of content. Users can analyze one or more groups of content based on their own individual specialties and roles. In this embodiment, a single user may create multiple rules to allow multiple groups of content to be independently segregated, sorted and presented to the user for analysis. The embodiment allows users to analyze content in the order of priority based on the current needs, and change that order when the need changes.

In this embodiment, the Rules Manager allows for the prioritization of the one or more rules, and further includes addition of selection parameters to further define the one or more rules. In this embodiment, the rules manager increases the speed of overall system responses by refreshing the UI upon any change or update to one or more rules. Additionally, the embodiment can display the number of posts the embodiment returns in applying any particular rule definition at the time the rule was created, and whenever that rule is created and/or saved. In this embodiment, the Rules Manager can also display the number of posts returned by changing the search criteria from requiring an exact match for search terms to permitting near matches for one or more of the criteria sections.

In another embodiment a re-scoring manager includes but is not limited to the ability for a user to re-score a post from the response manager; adding additional topics to rescore against; and/or changing the existing score for a topic.

In one embodiment, the feature set of the Engagement Manager can include a search, folder structure, batch actions activities, activity details, and/or usability enhancements. For example, the search feature can allow users to search across their active and closed threads. This capability can be implemented to make optional "Responding Rules." The user can define and identify specific groups of posts that are actionable. In addition to search functionality, users can also save searches over time. Folder structure provides users with the identification of subsets of workable posts without needing to re-search. Unassigned posts can be viewed by individual topics, regardless of the user role. Administrators can see the current workstream of users by looking at individual user folders. Administrator approval and pass queues can have a folder so that the administrators can work through items that are targeted to them. Closed posts also can have a folder for quick access. Users can switch between different views, while also keeping the content separate based on different user scenarios.

User activities include the lifecycle of threads through the engagement process. User activities are actions performed by users on content, thus dealing with, by some response of the user, with the incoming results containing media. Users can perform as many activities as necessary to engage with, respond to, and/or gather responses from the community based on the content containing media. For example, wherein community response to user is context- and thread-dependent, the responses from user can likewise target the community audience in a context- and thread-dependent manner, and reactions to the user can be harvested from the community in a context- and thread-dependent manner. For example, user activities can include, but are not limited to, monitoring, and/or responsive media formats, responding via phone, IM, email, PM, post, or not responding, adding a note to thread, and the like. In addition, the system can record the user activities, for example, assigning action, archiving, marking as responded, marking as pending approval for later action, engaged in active conversation, and the like. In embodiments of the invention the users activity can be decoupled from status of media content i.e. the stage at which a media content/post exists in the lifecycle.

In another embodiment, to support ongoing engagement, as well as transferring assignment of a specified content thread to different users (e.g., different users can be part of a working team, or corporate group), the system provides capabilities to capture information that is specific for the situation. Each user activity logged has an editable Title, Description and Outcome. Through this, users can capture information for themselves or others to read. User attached information can be attached to the content item so that the user engagement can be audited in the future and/or used for reference when reviewing a specific instance of communication. An outcome can be set as needed in any user activity. Although outcomes are available for any user activity, it is the engagement-specific activities that are the focus for setting this field. The outcome can be used, for example, to track how the community has responded to a given activity or a given user.

In one embodiment, business intelligence includes a summary dashboard. In this embodiment, the summary dashboard ca contain a high level view of one or more user's account. It can contain less detail than an individual marketing dashboard item and can represent an overall picture of the user account data. The summary dashboard, for example, can include post volume wherein the user can see the number of pieces of content for the chosen date range (e.g., past seven days), the last period of the same duration (e.g., last week), and the same period one year ago.

In an exemplary embodiment the summary dashboard can include network site volume which can show, e.g., the number of sites that have content for the chosen date range, the last period of same duration, and the same period one year ago. In an exemplary embodiment the summary dashboard can include the author volume showing the number of authors that wrote content for the chosen date range, the last period of same duration, and the same period one year ago. In an exemplary embodiment the summary dashboard can include incoming content showing the content related to specific topics coming into system across, e.g., the last week of posted dates. In an exemplary embodiment the summary dashboard can include current sentiment showing the distribution of sentiment for content on specific topics. In an exemplary embodiment the summary dashboard can include a topic summary showing a quick view of the topics with one or more of a sentiment meter, a post count and a percentage of posts with a given sentiment (e.g., neutral) for the given period and selected topics of interest. In an exemplary embodiment the summary dashboard can include volume trend showing the trend of content, sites and author volumes over the date range chosen. In an exemplary embodiment the summary dashboard can include top authors based one or more measurements such as activity, pull, reach, participation, authorship, or influence. In an exemplary embodiment the summary dashboard can include top sites based on measurements such as content, conversations, and authors.

In one embodiment, business intelligence includes a marketing/posts dashboard which can present a view of the account data with posts as the central area of focus. The Marketing/post dashboard can include for example a summary wherein the number of pieces of content for the chosen period, number of pieces for the last period of same duration, number of pieces for the same period from last year, and number of pieces from yesterday for the different categories are displayed, wherein the different categories include: total content, original posts, and or conversations or number of threads. In an exemplary embodiment the Marketing/post dashboard can include volume estimates, for example, an estimated volume trend based on keyword matching that measures the number of content in the following categories: total content, original posts, conversations, or number of thread. In an exemplary embodiment the Marketing/post dashboard can include relevant volume for example, the determined relevant volume trend obtained after the categorization and sentiment scoring processes have taken place in the following categories: total content, original posts, conversations, or number of threads. In an exemplary embodiment the Marketing/post dashboard can include sentiment distribution, for example, for topics chosen in the filter, this graph can show the distribution of positive, negative, and mixed from the portion of relevant posts that contain sentiment. The sentiment distribution can be measured, for example, as percentage scale to ensure clarity that can be masked from topic-post amplification. In an exemplary embodiment the Marketing/post dashboard can include metrics, for example, statistics of content includes top sites, top author, top topic and top thread. In an exemplary embodiment the Marketing/post dashboard can include topics metrics, for example for each of the chosen topics of interest, the number of pieces of content for the chosen period, last period of same duration, and same period from last year as well as a roll-up view of the sentiment that uses the same algorithm used for rolling up sentiment in the ecosystem map can be shown.

In one embodiment, business intelligence includes an Authors dashboard presenting a view of the account data with authors as the central area of focus. The Authors dashboard can include, for example: a summary, for example, the number of authors for the chosen period, last period of same duration, same period from last year, and yesterday and for the following categories: total authors, authors writing original posts and authors starting a conversation.

In an exemplary embodiment the Authors dashboard can include a list of the top authors based on the measurements such as: activity, (rank based on content volume), pull (rank based on author interaction on ranked authors original posts), reach (rank based on author interaction on ranked author's comments), participation (rank based on comment volume), authorship (rank based on original post volume) and influence (rank based on a weighted metric involving activity reach and pull), and/or topics (for each of the chosen topics of interest, this can show the number of authors for the chosen period, last period of same duration, and same period last year).

In one embodiment, business intelligence includes a Network Sites dashboard (marketing/sites) that can present a view of the account data, with network sites as a central area of focus. The network sites dashboard can include, for example a summary, for example, the number of sites for the chosen period, last period of same duration, same period from last year, and yesterday for the following categories: total sites, sites containing original posts, and sites containing a conversation. In an exemplary embodiment the Network Sites dashboard can include metrics such as: relevant volume (the determined relevant site volume trend obtained after the categorization and sentiment scoring processes have taken place), top sites (the top 10 sites based on the measurements such as: content, conversations, authors), and/or topics (for each of the chosen topics of interest, this can show the number of sites for the chosen period, last period of same duration and same period from last year).

In one embodiment, business intelligence includes a Topic Drill Down (marketing/topic drilldown) dashboard that can present a view of the data, arranged to represent a topic-centric perspective. The topic drill down dashboard can include, for example, a topic summary wherein the summary volume for a specific topic displays content, sites and authors for this period, last period of same duration and same period from last year. In an exemplary embodiment the Topic Drill Down dashboard can include topic comparison, for example a chart showing an overview of the chosen topic in relation to the rest of the currently active topics. In an exemplary embodiment the Topic Drill Down dashboard can include topic sentiment trend showing the volume of sentimented posts over time, broken down by positive, negative and mixed. In an exemplary embodiment the Topic Drill Down dashboard can include topic volume trend showing the volume for the topic trended over time for content, sites and authors. In an exemplary embodiment the Topic Drill Down dashboard can include topic metrics showing statistics including top site, top author and/or top thread. In an exemplary embodiment the Topic Drill Down dashboard can include topic sentiment summary including an overall sentiment summary for the topic showing: neutral vs. sentimented, breakdown of sentiment on positive, negative and mixed. In an exemplary embodiment the Topic Drill Down dashboard can include topic comparisons wherein a summary of all topics showing content volume for the chosen period, last period of same duration, and same period from last year is displayed.

In other embodiments of the invention a Scoring Manager included in the business intelligence dashboards includes filtering feature that ensures that the user is presented with relevant and useful content, i.e. users can focus on posts and content which are particularly important, because unwanted content is filtered from view.

In other embodiments of the invention a Response Manager included in the business intelligence dashboards can include a rescore function which provide users with the ability to re-score a content containing post even if that post has not been previously scored. This feature provides users with a streamlined way to score posts.

In other embodiments of the invention an Engagement Manager included in the business intelligence dashboards provides users with an interface to visualize the number of posts in each thread represented in their view by providing a small counter of posts for each thread. This feature can allow the user to make a decision on which threads to respond to based on the number of posts found therein. A data browser is included that can allow users to view a batch of unscored data, e.g., the last 30 days of unscored data for their account, as well as the ability to easily sort that data, and navigate the pages of data. In addition to providing a new way to browse through unscored data, the Data Browser allows the user to enter and search for particular exact match permalinks, regardless of topic matching. Using the data browser, users can locate threads of interest and the importance of the threads based on permalink searching, and then score these important items, bringing them into Engagement Manager.

In another embodiment the invention includes a user interface wherein a variety of information can be displayed at any given time, giving users a 'quick view' of information of particular interest. Included is a zoom feature for many of the charts displayed in the Dashboards. This Dashboard feature extends to line, scatter, summary, and pie charts in the Dashboard display. The invention can provide many date ranges by which the user can limit the data in the view and can improve the date range system by introducing a new custom date range builder. Using this feature, users can select a customized window of time by which to filter their view. This allows a user to filter and organize their data according to their specific needs.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method implementable in at least one electronic device coupled to a network and a display device, comprising the steps of:
   receiving from a user a selection of a topic;
   receiving, over the network, a data set comprising posted content related to the user-selected topic;
   determining, based on the data set, at least one of volume level and a sentiment type of a plurality of sentiment types of the posted content; and
   generating to the display device a user interface including a set of icons providing a graphic illustration of at least one of the determined posted-content volume level and posted-content sentiment type.

2. A method implementable in at east one electronic device coupled to a network and a display device, comprising the steps of
   receiving from a user a selection of a topic;
   receiving, over the network, a data set comprising posted content related to the user-selected topic;
   determining, based on the data set a sentiment type of a plurality of sentiment types of the posted content received over the network; and
   after determining the sentiment type of the posted content received over the network, transmitting over the network responsive media content of a type of a plurality of types, the type of responsive media content transmitted being, based on said determined sentiment type.

3. The method of claim 2, wherein transmitting responsive media content comprises selecting responsive media content from the group comprising: collecting follow up comments, aggregating follow up comments, enabling user to engage in interactive conversation, or management of said interactive responses in a workflow manager.

4. A system, comprising:
   a data processing system configured to acess over a network posted content related to a topic, and determine a sentiment type of a plurality of sentiment types of the posted content; and
   a responsive media server configured to transmit over the network, after determining the sentiment type of the posted content accessed over the network, responsive media content of a type of a plurality of types, the type of the responsive media content transmitted being based on said determined sentiment type.

* * * * *